US012798531B2

(12) United States Patent
Voss

(10) Patent No.: US 12,798,531 B2
(45) Date of Patent: Nov. 17, 2026

(54) SOLENOID VALVE, MORE PARTICULARLY FOR SLIP-CONTROLLED MOTOR-VEHICLE BRAKING SYSTEMS

(71) Applicant: Continental Automotive Technologies GmbH, Hannover (DE)

(72) Inventor: Christoph Voss, Frankfurt (DE)

(73) Assignee: Continental Automotive Technologies GmbH, Hannover (DE)

( * ) Notice: Subject to any disclaimer, the term of this patent is extended or adjusted under 35 U.S.C. 154(b) by 491 days.

(21) Appl. No.: 18/283,906

(22) PCT Filed: Mar. 17, 2022

(86) PCT No.: PCT/DE2022/200044

§ 371 (c)(1),
(2) Date: Sep. 25, 2023

(87) PCT Pub. No.: WO2022/199762

PCT Pub. Date: Sep. 29, 2022

(65) Prior Publication Data

US 2024/0166181 A1 May 23, 2024

(30) Foreign Application Priority Data

Mar. 25, 2021 (DE) ..................... 10 2021 202 928.0

(51) Int. Cl.
*B60T 8/36* (2006.01)
*F16K 31/06* (2006.01)

(52) U.S. Cl.
CPC .......... *B60T 8/363* (2013.01); *F16K 31/0655* (2013.01)

(58) Field of Classification Search
CPC ............................. B60T 8/363; F16K 31/0655
See application file for complete search history.

(56) References Cited

U.S. PATENT DOCUMENTS 5,975,654 A 11/1999 Zaviska et al.
6,152,420 A 11/2000 Hohl
(Continued)

FOREIGN PATENT DOCUMENTS

CN 104220310 A 12/2014
DE 102004001565 A1 8/2005
(Continued)

OTHER PUBLICATIONS

Notice of Preliminary Rejection issued on Nov. 30, 2024 from corresponding Korean patent application No. 10-2023-7030645.
(Continued)

*Primary Examiner* — Pamela Rodriguez
(74) *Attorney, Agent, or Firm* — Buchanan Ingersoll & Rooney PC

(57) ABSTRACT

A solenoid valve includes a valve tappet which is axially movably arranged in a valve housing and is able to open or to close a valve passage in the valve housing, the valve passage being formed in a valve seat, and having a magnet armature which is provided for the electromagnetic actuation of the valve tappet, and a spring element, which is arranged in such a way that the valve tappet remains in the electromagnetically non-actuated basic position of the magnet armature in a position lifted from the valve seat. For setting the residual air gap, a bushing is arranged between the valve tappet and the valve housing, the bushing being positioned in a force-fitting manner in the valve housing with an adjustment sleeve.

9 Claims, 3 Drawing Sheets

(56) References Cited

U.S. PATENT DOCUMENTS

| | | | | |
|---|---|---|---|---|
| 7,857,282 | B2 * | 12/2010 | Goossens ............ | F16K 31/0693 251/129.02 |
| 9,163,746 | B2 * | 10/2015 | Voss .................... | F16K 31/0658 |
| 2004/0026643 | A1 | 2/2004 | Hayakawa et al. | |
| 2007/0001142 | A1 | 1/2007 | Kratzer | |
| 2007/0164244 | A1 | 7/2007 | Kratzer | |
| 2012/0001109 | A1 | 1/2012 | Nanahara et al. | |
| 2013/0161545 | A1 | 6/2013 | Leventhal et al. | |
| 2015/0048268 | A1 | 2/2015 | Voss et al. | |

FOREIGN PATENT DOCUMENTS

| | | | |
|---|---|---|---|
| DE | 102004038497 | A1 | 3/2006 |
| DE | 102006002638 | A1 | 7/2007 |
| DE | 102006052629 | A1 | 5/2008 |
| DE | 102008015147 | A1 | 6/2009 |
| DE | 102010038506 | A1 | 2/2012 |
| DE | 102011005754 | A1 | 9/2012 |
| DE | 112009005460 | T5 | 10/2012 |
| DE | 102017202516 | A1 | 10/2017 |
| DE | 102018205089 | A1 | 10/2019 |
| DE | 102018209667 | A1 | 12/2019 |
| DE | 10 2019 209 267 | A1 | 12/2020 |
| DE | 102020206644 | A1 | 12/2021 |
| DE | 102020206742 | A1 | 12/2021 |
| JP | 2000046226 | A | 2/2000 |
| JP | 2008039157 | A | 2/2008 |
| WO | 2017178271 | A1 | 10/2017 |

OTHER PUBLICATIONS

Search Report dated Nov. 12, 2021 from corresponding German patent application No. 10 2021 202 928.0.

International Search Report and Written Opinion dated Jun. 20, 2022 from corresponding International patent application No. PCT/DE2022/200044.

Search Report dated Mar. 5, 2021 from related German patent application No. 10 2020 206 644.2.

Search Report dated Mar. 11, 2021 from related German patent application No. 10 2020 206 742.2.

Office Action (The First Office Action) issued Apr. 4, 2026, by the State Intellectual Property Office of People's Republic of China in corresponding Chinese Patent Application No. 202280022289.X and an English translation of the Office Action. (20 pages).

* cited by examiner

SOLENOID VALVE, MORE PARTICULARLY FOR SLIP-CONTROLLED MOTOR-VEHICLE BRAKING SYSTEMS

CROSS-REFERENCE TO RELATED APPLICATIONS

This application is a national stage application, filed under 35 U.S.C. § 371, of International Patent Application No. PCT/DE2022/200044, filed on Mar. 17, 2022, which claims priority to German patent application No. 10 2021 202 928.0, filed on Mar. 25, 2021, each of which is incorporated by reference.

TECHNICAL FIELD

The invention relates to a solenoid valve, in particular for slip-controlled motor vehicle brake systems.

BACKGROUND

DE 10 2006 052 629 A1 has already disclosed a solenoid valve which is switched to open in the electromagnetically non-excited state, consisting of a magnet armature for actuating a valve tappet, which is movable counter to the action of a return spring, in a tubular valve housing which has a pressure medium passage in a valve seat, said pressure medium passage being closed by means of the valve tappet when the magnet armature is excited.

The design, however, has the disadvantage that the residual air gap between the magnet armature and the valve housing, which is configured as a magnet core, can be set exclusively by displacement of the valve seat in the valve housing, and therefore the valve seat is intended to be easily displaceable in the valve housing in order to be able to set the residual air gap precisely. However, this has the disadvantage that high demands are imposed on the manufacturing and monitoring of the required setting parameters in order to place the valve seat securely in its end position permanently after the residual air gap has been set. A further disadvantage arises from the fact that the residual air gap can be set exclusively counter to the valve closing direction.

It is now the object of the present invention to provide a solenoid valve of the type mentioned at the beginning which does not have the aforementioned disadvantages.

BRIEF DESCRIPTION OF THE DRAWINGS

Further features and advantages of the disclosure will be discussed below on the basis of the description of a plurality of exemplary embodiments with reference to drawings.

In the drawings.

DETAILED DESCRIPTION

Figure 1:
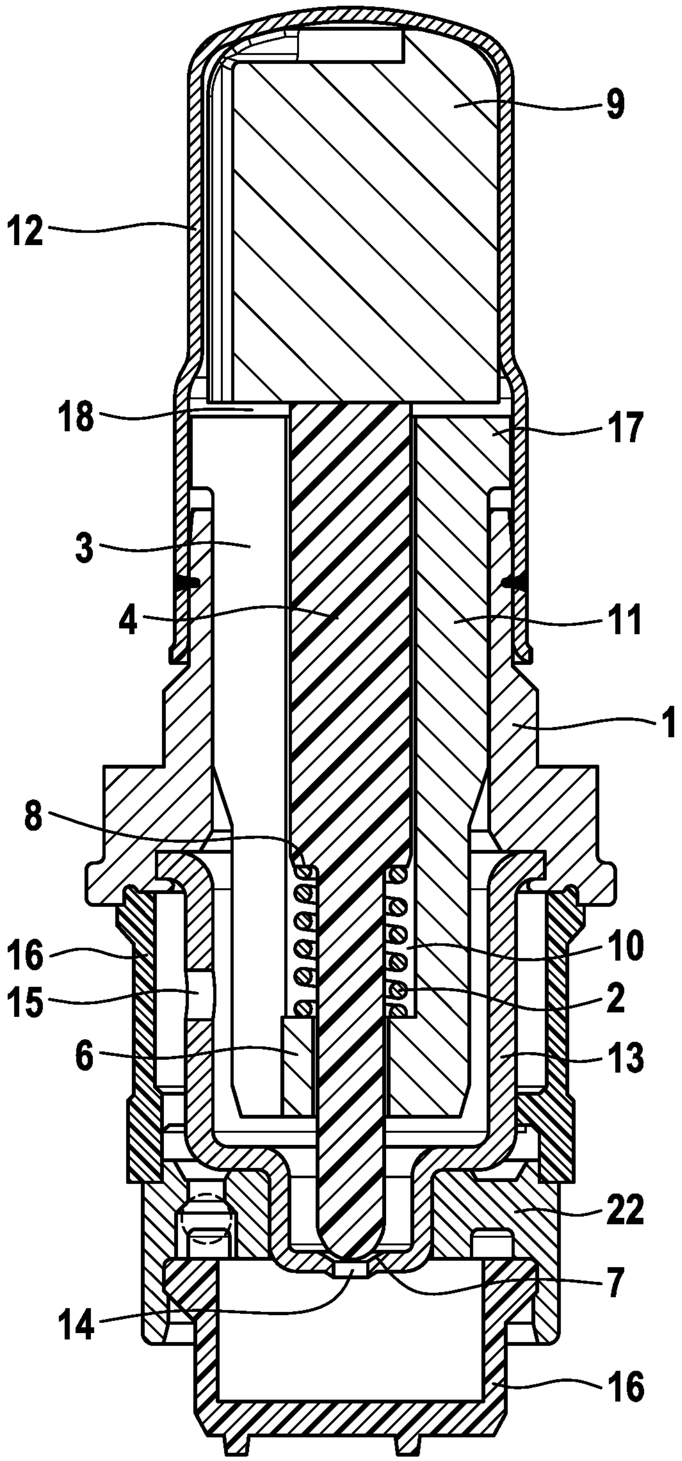
FIG. 1 shows the solenoid valve according to one exemplary embodiment in longitudinal section after the adjustment of a bushing, which is pressed into the valve housing, by utilizing an adjustment sleeve.

FIG. 1 shows a considerably enlarged view of a longitudinal section of a solenoid valve which is open in the electromagnetically non-excited state and may be used for slip-controlled hydraulic motor vehicle brake systems.

The solenoid valve has a valve tappet 4 which is axially movably arranged in a valve housing 1 and is able to open or to close a valve passage in the valve housing 1, the valve passage being formed in a valve seat 7, and having a magnet armature 9, which is provided for the electromagnetic actuation of the valve tappet 4, and a spring element 2, which is arranged in such a way that the valve tappet 4 remains in the electromagnetically non-actuated basic position of the magnet armature 9 in a position lifted from the valve seat 7.

As per the figure, the magnet armature 9 is accommodated within an austenitic sheet metal sleeve 12, which is preferably welded to the thick-walled, tubular valve housing 1, the "central housing", which ensures the fastening in a valve receiving bore of a valve receiving body.

The sheet metal sleeve 12 is produced in the form of a dome-shaped closed cap preferably by deep drawing of thin sheet metal, whereas the contour of the tubular valve housing 1 is manufactured cost-effectively by drop forging or cold extrusion from a steel blank, which has a ferritic material structure in order to form magnetic properties.

On both sides of the valve seat 7, a fluid passage 14, 15 leads in each case into the further sheet metal sleeve 13, which, as per the figure, is arranged below the valve housing 1, said fluid passage being embodied, as per the figure, above the valve seat 7 as a laterally punched hole and below the valve seat 7 as a vertically extending central bore.

In the electromagnetically non-excited valve basic position depicted, as a result of the action of the spring element 2, the valve tappet 4 remains in relation to the valve seat 7 at a distance opening up the valve passage in the valve seat 7, and therefore an unobstructed hydraulic connection between the fluid passages 14, 15 leading into the lower sheet metal sleeve 13 on both sides of the valve seat 7 is ensured.

By contrast, the valve tappet 4 closes the valve passage in the valve seat 7 in the electromagnetically excited valve position. Advantageously, the valve tappet 4 is produced from a material which does not conduct the magnetic flux, for example, from a plastic, for which purpose use is made of polyether ether ketone (PEEK) and that portion of the valve tappet 4 which faces the valve seat 7 and is arranged within a bushing 11 has a shoulder 8 on which the spring element 2 is supported. As per the figure, the spring element 2 is clamped within the annular chamber 10 as an integrated component of the bushing 11 between the shoulder 8 and an inner ring 6 formed at the lower end of the bushing 11.

The use of a valve tappet 4 produced from plastic enables the valve seat 7 to be produced cost-effectively by deep drawing of thin sheet metal, which is hardened by gas nitriding if desired or required.

For setting the residual air gap 18, an axially displaceable bushing 11 is provided in the valve housing 1, the bushing 11 being arranged directly between the valve tappet 4 and the valve housing 1 and taking up its end position frictionally in the valve housing 1 after the residual air gap 18 is set. The adjustment of the bushing 11 can be gathered from FIG. 3.

Figure 2:
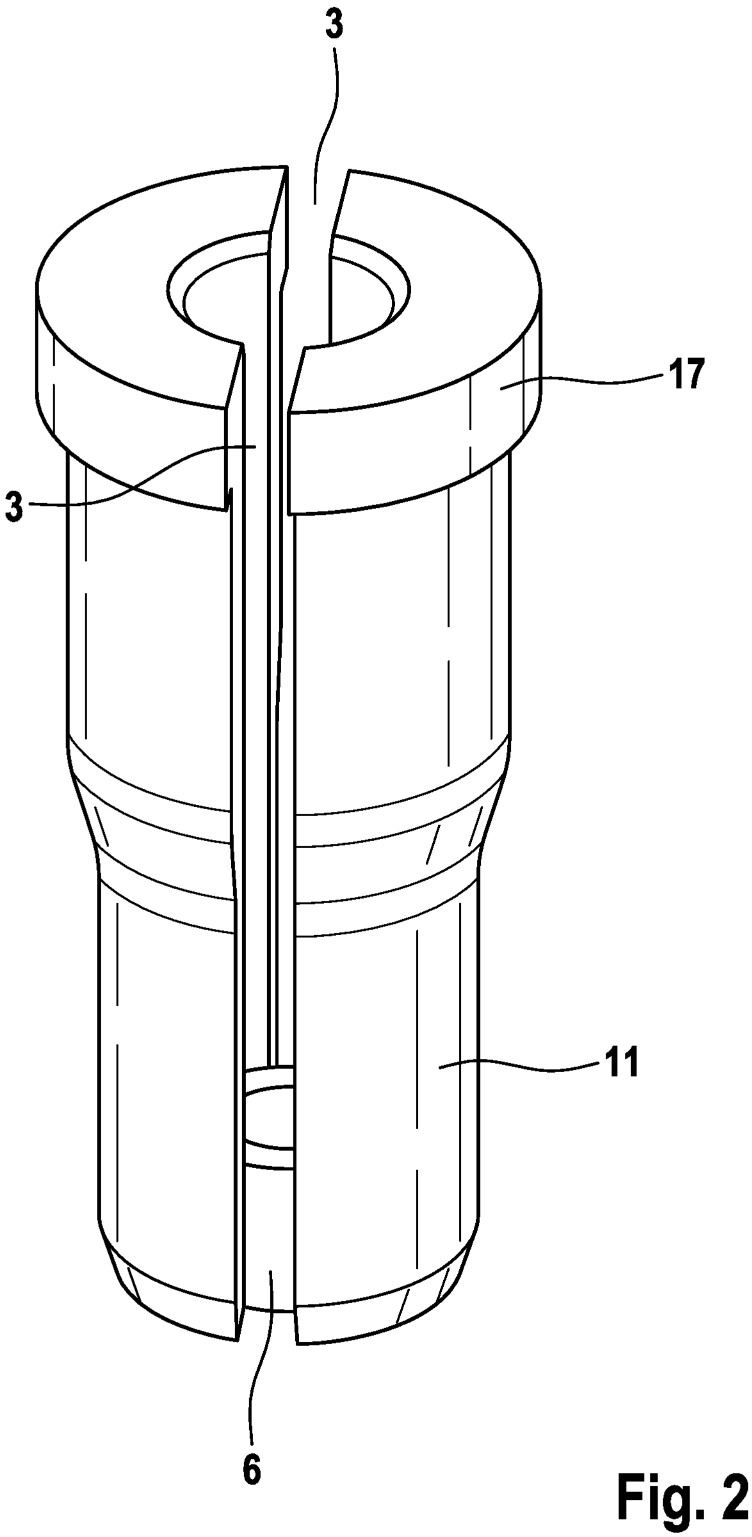
FIG. 2 shows the bushing in a perspective view.

FIGS. 1 and 2 show all the details for constructing the bushing 11, which has a bore which is adapted to the diameter of the valve tappet 4 and in which the valve tappet 4 and the spring element 2 are accommodated with radial play. The bushing 11 has the inner ring 6 as a homogeneous component on its end region facing the valve seat 7, in order to be able to support the spring element 2 which interacts with the valve tappet 4. By way of example, two continuous longitudinal slots 3 are provided distributed in a diametric arrangement over the circumference of the bushing 11, in order to be able to influence the required press-in and displacement force within the valve housing 1, depending on the design of the longitudinal slots 3, for which purpose the longitudinal slots 3 extend over the length of the bushing 11, which is in force-fitting contact with the valve housing 1. In order to avoid an adverse effect on the magnetic force during the electromagnetic actuation of the magnet armature 9, the longitudinal slots 3 extend in the direction of the axis of symmetry of the valve and thus parallel to the magnetic field lines that can be generated from the excitation of a valve coil. The selected design of the longitudinal slots 3 means that an unobstructed volume compensation on both sides of the bushing 11 is possible during the switching of the valve, without there being the need to provide compensating grooves in the region of the valve tappet 4.

The bushing 11, like the valve housing 1, consists of a material which conducts the magnetic flux, and therefore the bushing 11 takes on the function of the magnet core or magnetic pole. Consequently, an end of the bushing 11 facing the magnet armature 9 has an overhang 17 in relation to the valve housing 1, between which overhang and the magnet armature 9 the residual air gap 18 is formed. In one embodiment, the bushing 11 is embodied as a sintered part because of the selected geometry. By modification of the longitudinal slots 3 in the form of outer channels introduced laterally on the bushing 11, manufacturing as a drop-forged part is also conceivable.

Figure 3:
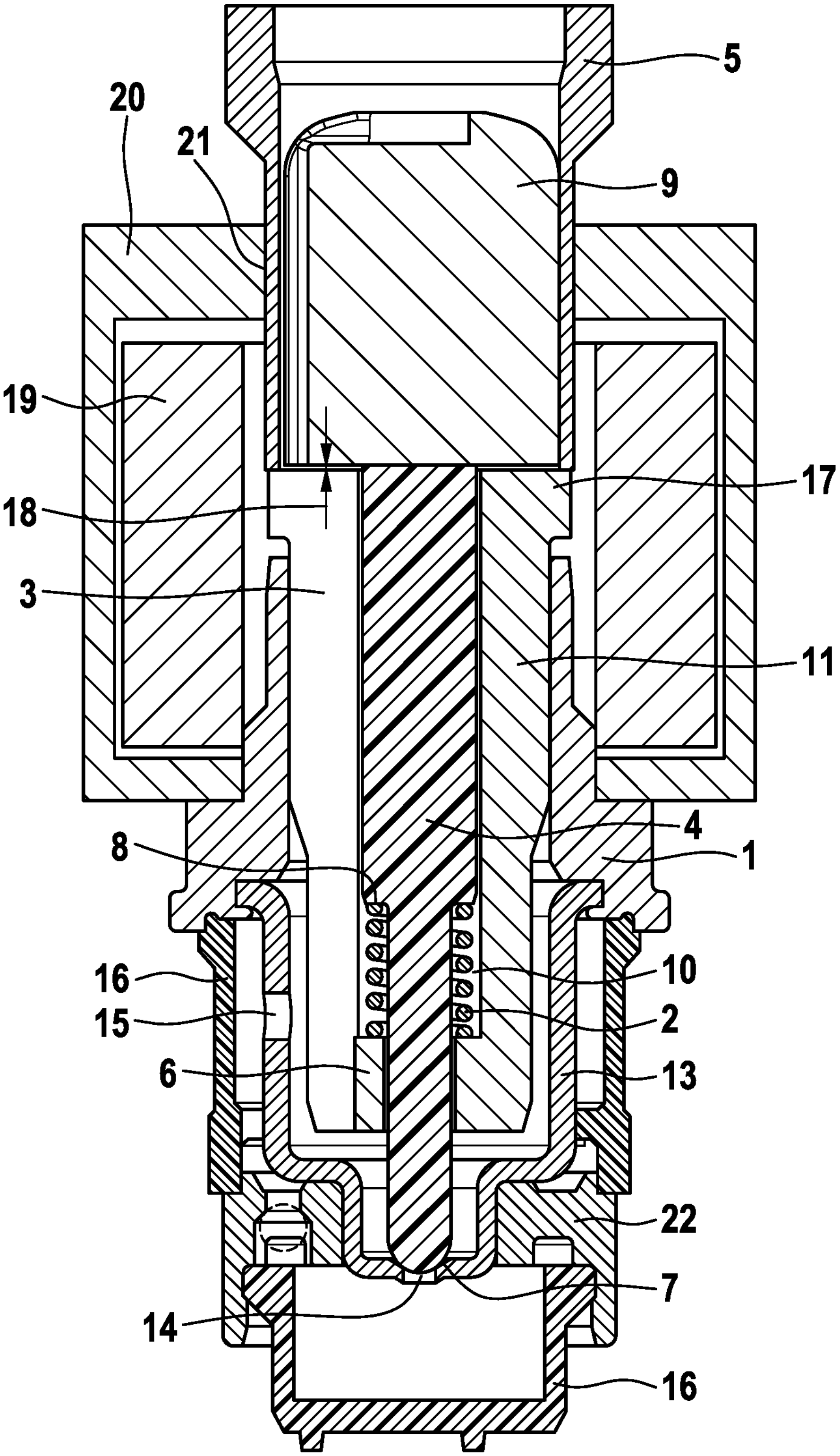
FIG. 3 shows the solenoid valve according to FIG. 1 during the adjustment of the bushing by utilizing the adjustment sleeve.

Furthermore, FIGS. 1 and 3 show the sheet metal sleeve 13, according to which the valve seat 7 is formed by a pot-shaped, downwardly deep-drawn portion of the sheet metal sleeve 13, which carries a nonreturn valve housing 22 on the outer circumference, on the underside of which a filter element 16 is mounted.

As is clearly seen from FIG. 3, the bushing 11, which is arranged between the valve tappet 4 and the sheet metal sleeve 12, is adjusted in a force-fitting manner in a defined displacement position in the valve housing 1 utilizing an adjustment sleeve 5. Since that end of the bushing 11 which faces the magnet armature 9 has not only an axial, but also a radial overhang 17 in relation to the valve housing 1, the adjustment sleeve 5 can be placed on the end face of the bushing 11 as a result of the smaller armature diameter, in order to displace the bushing 11 within the bore in the tubular valve housing 1 in a simple and yet precise manner. Thus, the residual air gap 18 located between the overhang 17 and the magnet armature 9 can be adjusted infinitely variably by the adjustment sleeve 5 with little application of force. For this purpose, the diameter of the adjustment sleeve 5 is adapted to the diameter of the bushing 11 in the region of the overhang 17.

In order to enable an adjustment of the residual air gap 18 in the electromagnetically closed position of the valve tappet 4 with the adjustment sleeve 5, the valve housing 1 carries a magnet coil 19, which is accommodated in a yoke plate 20, the passage opening 21 of which facing away from the tubular valve housing 1 is adapted to the diameter of the adjustment sleeve 5. Thus, during electromagnetic excitation, the adjustment sleeve 5 produced from a material which does not conduct the magnetic flux can be introduced unhindered into the magnet coil 19.

The adjustment of the residual air gap 18 is intended to be clarified with reference to FIG. 3, for which purpose, the adjustment sleeve 5 is placed through the opening in the magnet coil 19, which can be applied to the valve housing 1, onto the bushing 11 arranged in the valve housing 1 and the bushing 11 is displaced until the residual air gap 18 to be calibrated between the magnet armature 19 and the bushing 11 is reached, with the special characteristic that, during the displacement process, in order to ensure tight contact of the valve tappet 4 with the valve seat 7, firstly a sufficiently large electrical current is applied to the magnet coil 19 and at the same time a defined pneumatic or hydraulic test pressure is applied in the valve opening direction to the valve tappet 4 remaining on the valve seat 7. The residual air gap 18 to be set depending on the test current and test pressure is thus reached as soon as, with increasing displacement travel of the bushing 11 in the direction of the tubular valve housing 1, the valve tappet 4 lifts off its valve seat 7 or jumps back into its open valve basic position under the action of the spring element 2.

With the completion of the adjustment of the residual air gap 18, only the adjustment sleeve 5 and the magnet coil 19 have to be removed in order to close the valve housing 1 with the austenitic sheet metal sleeve 12 known from FIG. 1.

Consequently, on the basis of the details depicted and hereby described, a solenoid valve is provided, the residual air gap 18 of which can be set in a simple and precise manner from the direction of the magnet armature side.

The invention claimed is:

1. A solenoid valve, for slip-controlled motor vehicle brake systems, comprising:
- a tubular valve housing which conducts magnetic flux and in which a valve tappet is axially movably arranged,
- said valve tappet being able to open or to close a valve passage in a valve seat, and having a magnet armature, which is accommodated in a sheet metal sleeve for electromagnetic actuation of the valve tappet, and a spring element, which is arranged in such a way that the valve tappet remains in the electromagnetically non-actuated basic position of the magnet armature in a position lifted from the valve seat, wherein
- a bushing, having a plurality of longitudinal slots which are distributed over its circumference and extend over an entire length of the bushing, is arranged between the valve tappet and the sheet metal sleeve, said bushing being positioned in a force-fitting manner in contact with the valve housing and an adjustment sleeve.

2. The solenoid valve as claimed in claim 1, wherein an end of the bushing facing the magnet armature has an overhang in relation to the valve housing, the diameter of which overhang corresponds to the diameter of the adjustment sleeve.

3. The solenoid valve as claimed in claim 2, wherein a residual air gap which can be adjusted by the adjustment sleeve is formed between the overhang of the bushing and the magnet armature.

4. The solenoid valve as claimed in claim 1, wherein the valve housing carries a magnet coil, which is accommodated in a yoke plate, a passage opening of which facing away from the tubular valve housing is adapted to the diameter of the adjustment sleeve.

5. The solenoid valve as claimed in claim 1, wherein the sheet metal sleeve and the adjustment sleeve are produced from a material which does not conduct the magnetic flux.

6. The solenoid valve as claimed in claim 1, wherein the bushing is produced from a sintered material which conducts the magnetic flux.

7. The solenoid valve as claimed in claim 1, wherein, on its end region facing away from the magnet armature, the bushing has an inner ring through which the valve tappet is passed, with the spring element thereof being clamped between the inner ring and a shoulder on the valve tappet.

8. A method for adjusting a solenoid valve having a tubular valve housing which conducts the magnetic flux and in which a valve tappet is axially movably arranged, the valve tappet being able to open or to close a valve passage in a valve seat, a magnet armature accommodated in a sheet metal sleeve for electromagnetic actuation of the valve tappet, and a spring element, arranged such that the valve tappet remains in the electromagnetically non-actuated basic position of the magnet armature in a position lifted from the valve seat, said method comprising:

providing a bushing having a plurality of longitudinal slots which are distributed over its circumference and extend over an entire length of the bushing;

frictionally adjusting the bushing in the tubular valve housing with a non-magnetic adjustment sleeve placed onto the bushing arranged in the tubular valve housing through an opening in a magnet coil, which can be applied to the tubular valve housing, and displacing the bushing until a residual air gap to be calibrated between the magnet armature and the bushing is reached.

9. The method as claimed in claim 8, further comprising:

applying an electrical current defined for adjusting the residual air gap to the magnet coil, applying a defined pneumatic or hydraulic pressure to the valve tappet, which remains electromagnetically at the valve seat, displacing the bushing with the non-magnetic adjustment sleeve, which is inserted into the magnet coil, in the direction of the tubular valve housing until the valve tappet lifts off its valve seat, removing the non-magnetic adjustment sleeve and the magnet coil, and closing the tubular valve housing with an austenitic sheet metal sleeve.

* * * * *